United States Patent [19]

Kikuchi

[11] Patent Number: 4,990,900
[45] Date of Patent: Feb. 5, 1991

[54] TOUCH PANEL

[75] Inventor: Hiroshi Kikuchi, Furukawa, Japan

[73] Assignee: Alps Electric Co., Ltd., Tokyo, Japan

[21] Appl. No.: 204,448

[22] Filed: Jun. 9, 1988

[30] Foreign Application Priority Data

Oct. 1, 1987 [JP] Japan .............. 62-149257[U]
Oct. 1, 1987 [JP] Japan .............. 62-149259[U]

[51] Int. Cl.$^5$ .............................................. G09G 3/02
[52] U.S. Cl. ........................................ 340/712; 341/20;
 178/18; 200/5 A
[58] Field of Search ................. 341/22, 31, 33, 34;
 340/712, 784, 719; 250/221; 178/18; 350/350
 R, 334, 339 R, 349; 200/5 A

[56] References Cited

U.S. PATENT DOCUMENTS

| Re. 28,365 | 3/1975 | Braue . | |
|---|---|---|---|
| 3,603,983 | 9/1971 | Mitchell | 341/34 |
| 3,617,666 | 11/1971 | Braue . | |
| 3,864,024 | 2/1975 | Olson . | |
| 3,911,215 | 10/1975 | Hurst et al. . | |
| 4,017,858 | 4/1977 | Tannas, Jr. . | |
| 4,180,711 | 12/1979 | Hirata et al. . | |
| 4,220,815 | 9/1980 | Gibson et al. . | |
| 4,373,124 | 2/1983 | Frame . | |
| 4,594,482 | 1/1986 | Saito et al. . | |
| 4,604,605 | 8/1986 | Meyers et al. | 341/34 |
| 4,607,147 | 8/1986 | Ono et al. . | |
| 4,626,961 | 12/1986 | One et al. . | |
| 4,707,570 | 11/1987 | Ide et al. | 178/18 |
| 4,734,218 | 3/1988 | Takuma et al. | 350/349 |
| 4,737,310 | 4/1988 | Imazeki et al. | 350/349 |
| 4,740,781 | 4/1988 | Brown | 340/712 |
| 4,745,241 | 5/1988 | Furukawa et al. . | |
| 4,778,619 | 10/1988 | Wakemoto et al. | 350/349 |
| 4,780,531 | 10/1988 | Kano et al. | 350/349 |
| 4,815,826 | 3/1989 | Fergason | 350/334 |
| 4,838,660 | 1/1989 | Fergason | 350/334 |
| 4,839,634 | 6/1989 | More et al. | 340/712 |
| 4,841,290 | 6/1989 | Nakano et al. | 340/712 |

FOREIGN PATENT DOCUMENTS

| 2370348 | 7/1978 | France . |
| 2447597 | 9/1980 | France . |
| 60-112844 | 7/1985 | Japan . |
| 428467 | 4/1975 | U.S.S.R. . |
| 81/00787 | 3/1981 | World Int. Prop. O. . |

OTHER PUBLICATIONS

Johnson et al.—"Optical Keyboard", IBM Technical Disclosure Bulletin; vol. 20, No. 9, Feb. 9, 1978, pp. 3612-3613.

Primary Examiner—Jeffrey A. Brier
Assistant Examiner—M. Fatahiyar
Attorney, Agent, or Firm—Guy W. Shoup; Norman R. Klivans

[57] ABSTRACT

A touch panel having a panel body formed by transparent upper and lower electrodes spaced a predetermined distance. The touch panel is mounted on a front surface of a display device to detect a coordinate at a depressed position on the upper electrode. The improvement comprises a transparent insulating liquid material filled between the upper and lower electrodes and a coloring agent containing pigment or dyestuff dispersed in the liquid material. In another aspect, the improvement comprises a transparent insulating liquid material filled between the upper and lower electrodes and an insulating fine powder dispersed in the liquid material.

3 Claims, 2 Drawing Sheets

TOUCH PANEL

BACKGROUND OF THE INVENTION

The present invention relates to a touch panel adapted to be mounted on a display device such as CRT and detect a coordinate at a position of depression by a finger, a pen, etc.

Generally, the touch panel is formed by laminating transparent upper and lower electrodes with a spacer such as a dot spacer interposed therebetween, and supporting the lower electrode to a transparent support plate. The touch panel thus formed is mounted on a display surface of a display device such as CRT or LCD (liquid crystal display), and is depressed at a predetermined position by means of a pen, a finger, etc. as viewed by an operator to detect a coordinate at such a depressed position, thus providing a coordinate input device.

In such a touch panel as mentioned above, it is known that a filter permitting transmitting of a certain part of spectrum from the display device as a light source and absorbing the other part is provided so as to improve a contrast at a display portion of the display device and adjust a color tone.

Such a conventional filter is formed by uniformly dispersing pigment or dyestuff made of organic or inorganic materisls in a transparent acrylic resin, and the filter is coated on a single surface or both surfaces of the upper electrode and the lower electrode. Alternatively, in the case that the transparent support plate is formed of a transparent synthetic resin such as acrylic resin, pigment or dyestuff as mentioned above is kneaded in the transparent support plate to integrally form the filter with the support plate. As a result, the steps of manufacturing the touch panel with such a filter as mentioned above are complicated to cause an increase in cost.

Further, in the prior art touch panel as mentioned above, an air gap is defined by the dot spacer between the upper electrode and the lower electrode. Accordingly, there occurs reflection or refraction of light at an air layer formed by the air gap, causing a reduction in transmission rate of the touch panel as a whole. Additionally, the outline of the dot spacer is readily visualized to generate a problem in visibility.

Furthermore, as the dot spacer is fixed on either of the electrodes, there exists a non-contact area of both the electrodes, that is, a dead zone of the input device, causing incapability of minute coordinate detection. Particularly in the case of forming the dot spacer by a general printing technique, a diameter of the spacer tends to be greater at a bottom surface than a height thereof in relation to the viscosity of the spacer. Therefore, the existence of the dead zone as mentioned above cannot be ignored.

Other documents disclosing a touch panel and a membrane switch are co-pending U.S. patent application Ser. Nos. 07/187,263, filed Apr. 28, 1988, entitled "Membrane Switch" and 07/180,294, filed Apr. 12, 1988, entitled "Touch Panel".

In another conventional touch panel as disclosed in Japanese Utility Model Laid-Open Publication No. 60-112844, a transparent insulating liquid acting as a spacer is enclosed between the upper electrode and the lower electrode. When the touch panel is depressed from the upper electrode side, the insulating liquid at a depressed portion is moved aside to allow the contact between both the electrodes, while when the depression force is removed, both the electrodes are maintained separate from each other owing to the fluidity of the insulating liquid. Thus, as there are absent the air layer and the dot spacer as mentioned previously between both the electrodes, the visibility may be improved, and the resolution may be also improved because of no dead zone.

Although such a touch panel utilizing the insulating fluid as a spacer exhibits a good function regarding the prevention of reduction in visibility and the improvement in resolution, there still remains a problem. That is, the insulating liquid has a good fluidity in response to a depression force, but it is inferior in restorability when removing the depression force. Accordingly, there is a possibility of both the electrodes erroneously contacting with each other during a long service life. Further, as a long restoring time is needed, operation feeling is rendered unsatisfactory.

SUMMARY OF THE INVENTION

It is an object of the present invention to provide a touch panel which may exhibit a filter effect at a low manufacturing cost.

It is another object of the present invention to provide a touch panel which may improve the visibility of an input surface.

It is a further object of the present invention to provide a touch panel which may eliminate an input dead zone and ensure a reliable input operation.

According to one aspect of the present invention, there is provided in a touch panel having a panel body formed by transparent upper and lower electrodes spaced a predetermined distance, said touch panel being mounted on a front surface of a display device to detect a coordinate at a depressed position on said upper electrode; the improvement comprising a transparent insulating liquid material filled between said upper and lower electrodes and a coloring agent containing pigment or dyestuff dispersed in said liquid material.

As described above, the liquid material such as oil or gel is used as a spacer material, and the coloring agent containing pigment or dyestuff is uniformly dispersed in the liquid material. Accordingly, a filter effect may be exhibited by the coloring agent dispersed in the spacer material without the necessity of providing a filter layer, thus reducing a cost. Further, the upper and lower electrodes are maintained spaced a predetermined gap by the liquid material filled therebetween. Accordingly, it is possible to prevent a reduction in visibility due to an air gap.

According to another aspect of the present invention, there is provided in a touch panel having a panel body formed by transparent upper and lower electrodes spaced a predetermined distance, said touch panel being mounted on a front surface of a display device to detect a coordinate at a depressed position on said upper electrode; the improvement comprising a transparent insulating liquid material filled between said upper and lower electrodes and an insulating fine powder dispersed in said liquid material.

In operation, when the touch panel is depressed from the upper electrode side at an arbitral position, the liquid material flows aside away from this position by the depression force to allow the upper and lower electrodes to come into contact with each other and be electrically connected. At this time, since the insulating fine powder can be freely moved in the liquid material, the fine powder at the depressed position is also moved aside, thus eliminating the dead zone. When the depression force is removed, the upper electrode is quickly restored to its original condition with the aid of the fine powder, and the liquid material is also restored to its original condition owing to the fluidity thereof. Thus, the upper and lower electrodes are maintained separate from each other.

Other objects and features of the invention will be more fully understood from the following detailed description and appended claims when taken with the accompanying drawings.

DETAILED DESCRIPTION OF THE PREFERRED EMBODIMENTS

Figure 1:
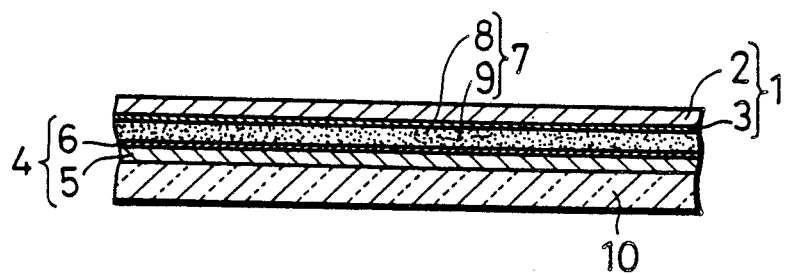
FIG. 1 is a cross section of the essential part of a preferred embodiment of the touch panel according to the present invention, under an undepressed condition.
Figure 2:
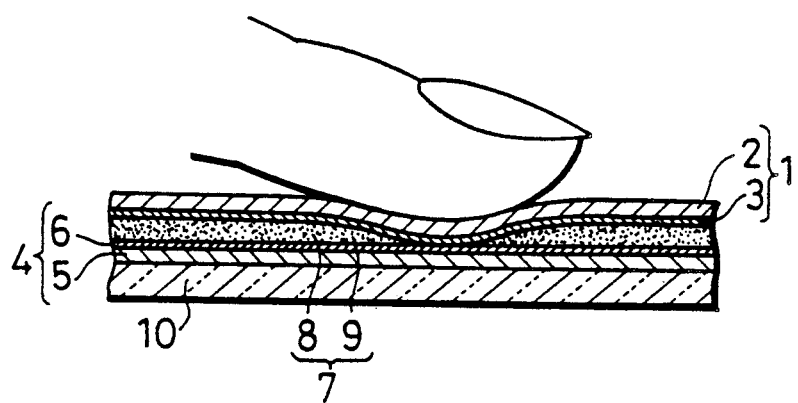
FIG. 2 is a view similar to FIG. 1 illustrating a depressed condition.

Referring now to FIG. 1 which shows a cross section of the touch panel under an undepressed condition according to a first preferred embodiment of the present invention, reference numeral 1 generally designates an upper sheet comprising a transparent film 2 formed of polyester or the like and an upper transparent electrode 3 such as ITO formed at a predetermined position on a lower surface of the film 2. Reference numeral 4 generally designates a lower sheet comprising a transparent film 5 formed of polyester or the like and a lower transparent electrode 6 such as ITO formed at a predetermined position on an upper surface of the film 5. Reference numeral 7 designates a spacer enclosed between the upper sheet 1 and the lower sheet 4. The spacer 7 comprises a transparent insulating liquid material 8 such as silicone or epoxy oil or gel and a coloring agent 9 such as pigment or dyestuff uniformly dispersed in the liquid material 8. The coloring agent 9 has such characteristics as to absorb a predetermined range of wavelength of an emission spectrum of a display device. Color of the coloring agent is selected according to the emission spectrum of the display device to be used. In the case of desiring a blue filter effect, for example, LIONEL BLUE ES, a pigment produced by TOYO INK MFG. CO., LTD. is preferably used. Reference numeral 10 designates a transparent support plate formed of acrylic resin. A laminate consisting of the upper sheet 1, the spacer 7 and the lower sheet 4 is mounted and fixed onto the support plate 10, thus forming the touch panel.

Figure 3A:
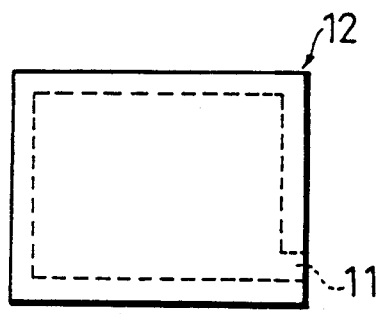
FIGS. 3(a) and 3(b) are views illustrating steps of manufacturing the touch panel of the present invention.
Figure 3B:
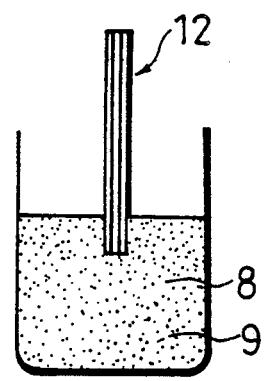

The touch panel is formed in the following manner. First, the upper sheet 1 and the lower sheet 2 are laminated at their peripheral edges except an opening 11 to form a cell 12 as shown in FIG. 3(a). Then, the cell 12 is put into a vacuum tank to be evacuated, and thereafter the opening 11 of the cell 12 is immersed into the liquid material 8 containing the coloring agent 9 as shown in FIG. 3(b). Then, the reduced pressure in the vacuum tank is increased to an ordinary pressure. As a result, the liquid material 8 is filled into the cell 12 by a suction force due to the reduced pressure in the cell 12 and a capillarity. Then, the opening 11 is sealed by an adhesive. The laminate thus obtained is laminated onto the support plate 10, thereby obtaining the touch panel.

In operation, the touch panel is mounted on a display surface of the display device such as CRT, and the upper sheet 1 is depressed at a portion corresponding to an appropriate display position by means of a pen or a finger as viewed by an operator. At this time, the liquid material 8 at the depressed portion is migrated away from this portion. As a result, the upper electrode 3 is brought into contact with the lower electrode 6 at the depressed point to thereby allow a coordinate position to be detected. When such a depression force is removed, the upper sheet 1 is restored to its original condition owing to the flexibility of the transparent film 2, and the spacer 7 is also restored to its original condition owing the the fluidity of the liquid material 8 as shown in FIG. 1. As a result, both the electrodes 3 and 6 are maintained separate from each other by the spacer 7 interposed therebetween.

As mentioned above, since the coloring agent 9 as a filter is uniformly dispersed in the liquid material 8, the coloring agent 9 acts to absorb a predetermined range of wavelength of the emission spectrum from the display device as a light source, thereby adjusting a color tone of the display device and improving a contrast at a displayed portion.

Figure 4:
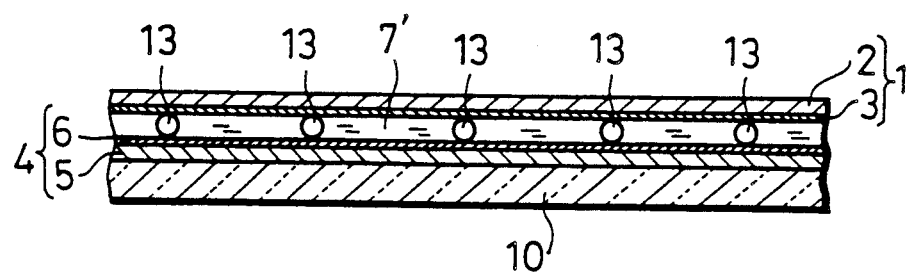
FIG. 4 is a cross section of the essential part of another preferred embodiment of the touch panel according to the present invention, under the undepressed condition.
Figure 5:
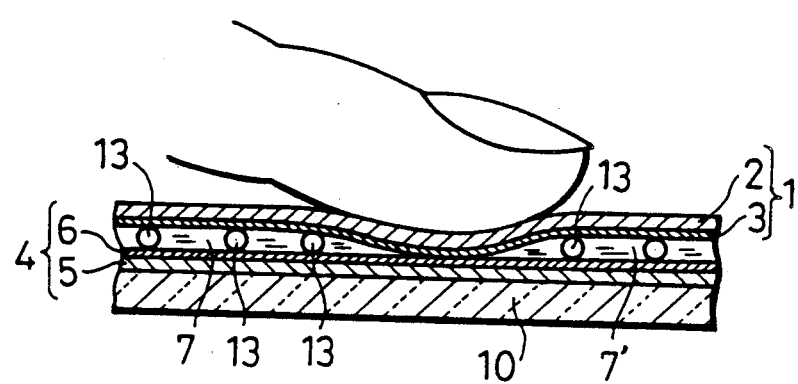
FIG. 5 is a view similar to FIG. 4, illustrating the depressed condition.

Referring next to FIGS. 4 and 5 which show another preferred embodiment of the present invention, wherein the same parts as those in the previous preferred embodiment are designated by the same reference numerals, reference numeral 7' designates a transparent liquid material enclosed between the upper sheet 1 and the lower sheet 4. The liquid material 7' is formed of silicone or epoxy oil or gel, for example. Transparent or opaque insulting fine powder 13 is uniformly dispersed in the liquid material 7'. The insulating fine powder 13 has a size of several tens of micrometers substantially identical with a gap length required between the upper electrode 3 and the lower electrode 6. A density of dispersion of the insulating fine powder 13 in the liquid material 13 can be moved in the liquid material 7'. The insulating fine powder 13 is preferably a transparent spherical powder such as MICROPEARL (produced by SEKISUI FINE CHEMICAL CO., LTD) which is a cross-linking polymer composed primarily of divinyl benzene, or MICRO ROD (produced by NIPPON ELECTRIC GLASS CO., LTD.) which is a glass with no alkali. The density of dispersion of the spherical powder in the liquid material 7' is preferably 1-100/cm$^2$.

In operation, when the transparent film 2 is depressed at an arbitrary position by a pen or a finger, the liquid material 7' at the depressed portion is migrated away from this portion. As a result, the upper electrode 3 at the depressed point is brought into contact with the lower electrode 6 to thereby allow a coordinate position to be detected as shown in FIG. 5. Since the insulating fine powder 13 is dispersed in the liquid material 7', it is moved together with the liquid material 7' by the depresssion force. Therefore, there is no possibility that the contact between both the electrodes 3 and 6 is hindered by the insulating fine powder 13. In particular, when the insulating fine powder 13 is spherical as in this embodiment, it is rolled on the lower electrode 6 by the depression force, thereby making the movement of the fine powder 13 more effective.

When the depression force is removed, the upper sheet 1 is restored to its original condition shown in FIG. 4 quickly and reliably with the aid of the insulating fine powder 13. At the same time, the liquid material 7' is also restored to its original condition shown in FIG. 4 owing to the fluidity thereof. As a result, both the electrodes 3 and 6 are maintained separate from each other by the liquid material 7' and the insulating fine powder 13 interposed therebetween.

As mentioned above, since both the electrodes 3 and 6 are maintained separate from each other owing to the particle size of the insulating fine powder 13 under the undepressed condition according to the preferred embodiment, they are prevented from erroneously contacting with each other during a long service life. Furthermore, since the insulating fine powder 13 is moved by the depression force under the depressed condition, an input dead zone may be eliminated to thereby improve a resolution. Moreover, since the transparent insulating liquid material 7' instead of an air layer is enclosed between the upper and lower electrodes 3 and 6, and the particle size of the insulating fine powder 8 dispersed in the liquid material 7' is very small such as several tens of micrometers, the liquid material 7' and the insulating fine powder 13 are almost not visually observed, thus improving the visibility of the touch panel.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a touch panel having a panel body formed by transparent upper and lower electrodes spaced a predetermined distance, said touch panel being mounted on a front surface of a display device to detect a coordinate at a depressed position on said upper electrode; the improvement comprising a transparent insulating liquid material filled between said upper and lower electrodes and a coloring agent containing pigment or dyestuff dispersed in said liquid material.

2. The touch panel as defined in claim 1, further comprising an insulating fine powder dispensened in said liquid material and wherein said insulating fine powder comprises a transparent spherical powder.

3. The touch panel as defined in claim 2, wherein said insulating fine powder is comprised of spheres having a diameter about equal to a spacing between said upper and said lower electrodes when said upper electrode is not in the depressed position.

* * * * *